United States Patent
Girlando et al.

(10) Patent No.: US 10,760,684 B2
(45) Date of Patent: Sep. 1, 2020

(54) DEVICE FOR ACTUATING A ROTATING SHAFT SELECTED FROM A PLURALITY OF PARALLEL ROTATING SHAFTS

(71) Applicant: General Electric Technology GmbH, Baden (CH)

(72) Inventors: Vincenzo Girlando, Padua (IT); Dario Bergamo, San Dona' di Piave (IT)

(73) Assignee: General Electric Technology GmbH, Baden (CH)

(*) Notice: Subject to any disclaimer, the term of this patent is extended or adjusted under 35 U.S.C. 154(b) by 276 days.

(21) Appl. No.: 15/534,843

(22) PCT Filed: Dec. 9, 2014

(86) PCT No.: PCT/EP2014/077045
§ 371 (c)(1),
(2) Date: Jun. 9, 2017

(87) PCT Pub. No.: WO2016/091288
PCT Pub. Date: Jun. 16, 2016

(65) Prior Publication Data
US 2017/0350507 A1    Dec. 7, 2017

(51) Int. Cl.
*F16H 1/06* (2006.01)
*F16H 63/34* (2006.01)
(Continued)

(52) U.S. Cl.
CPC ........... *F16H 63/3408* (2013.01); *F16H 1/06* (2013.01); *F16H 63/04* (2013.01); *F16H 63/304* (2013.01); *H01H 3/26* (2013.01); *H01H 3/40* (2013.01); *H01H 3/58* (2013.01); *H01H 31/003* (2013.01); *H01H 3/227* (2013.01)

(58) Field of Classification Search
CPC .. H01H 3/58; H01H 3/54; H01H 3/40; H01H 3/32; H01H 3/26; H01H 3/22;
(Continued)

(56) References Cited

U.S. PATENT DOCUMENTS 3,572,143 A * 3/1971 Riemsdijk ............... B21F 35/00
74/116
4,505,164 A * 3/1985 Yoshida ................... F16H 3/083
74/337
(Continued)

FOREIGN PATENT DOCUMENTS

DE         497 122 C    5/1930
EP       0 628 978 A1   12/1994
(Continued)

OTHER PUBLICATIONS

Machine Translation of FR 899759, obtained Jul. 17, 2019.*
(Continued)

*Primary Examiner* — Richard W Ridley
*Assistant Examiner* — Brian J McGovern
(74) *Attorney, Agent, or Firm* — Eversheds Sutherland (US) LLP

(57) ABSTRACT

A device for actuating a rotating shaft selected from a plurality of parallel rotating shafts, comprising a driving shaft supported and actuated by corresponding rotation means, which is provided with a driving gear for the transmission of torque, a plurality of driven shafts each one of which is provided with a corresponding driven gear that is designed to be meshed with the driving gear, the driven gears being arranged on the respective driven shaft in an axial position that is offset with respect to the other driven gears, the driving gear being capable of performing a translational movement axially with means of translational motion for alternate meshing with one of the driven gears, the device further comprising means of prevention of rotation for the driven shafts whose driven gear is not meshed with the driving gear.

9 Claims, 2 Drawing Sheets

(51) Int. Cl.
   *H01H 3/26* (2006.01)
   *H01H 3/40* (2006.01)
   *H01H 31/00* (2006.01)
   *H01H 3/58* (2006.01)
   *F16H 63/04* (2006.01)
   *F16H 63/30* (2006.01)
   *H01H 3/22* (2006.01)

(58) Field of Classification Search
   CPC .. H01H 3/227; H01H 1/06; F16H 1/06; F16H 63/04; F16H 63/02; F16H 63/10; F16H 63/304; F16H 63/3408; F16D 11/14
   See application file for complete search history.

(56) References Cited

U.S. PATENT DOCUMENTS

| | | | | |
|---|---|---|---|---|
| 4,644,113 A | * | 2/1987 | Huang | H01H 33/36 200/17 R |
| 5,235,939 A | * | 8/1993 | Levin | F01L 1/047 123/90.15 |
| 2007/0140772 A1 | * | 6/2007 | Baringa | B41J 23/02 400/636.2 |
| 2013/0228438 A1 | | 9/2013 | Yang | |

FOREIGN PATENT DOCUMENTS

| | | | | |
|---|---|---|---|---|
| FR | 899759 A | * | 6/1945 | ............... F16G 3/20 |
| GB | 483 439 A | | 4/1938 | |

OTHER PUBLICATIONS

International Search Report and Written Opinion issued in connection with corresponding PCT Application No. PCT/EP2014/077045 dated Aug. 7, 2015.

International Preliminary Report on Patentability issued in connection with corresponding PCT Application No. PCT/EP2014/077045 dated Jun. 13, 2017.

* cited by examiner

DEVICE FOR ACTUATING A ROTATING SHAFT SELECTED FROM A PLURALITY OF PARALLEL ROTATING SHAFTS

BACKGROUND

Embodiments of the present invention relate to a device for actuating a rotating shaft selected from a plurality of parallel rotating shafts.

Nowadays in the sector of isolating switches for high voltage which comprise an isolating switch and two earthing blades, for the rotation of the contact elements individual and independent drives are generally employed for each one of the elements to be rotated.

Such drives comprise a drive unit and a kinematic arrangement that is adapted to transmit the motion from the drive unit to the main part of the isolating switch or of the earthing blade.

Such conventional drives move, separately and independently, the contacts of the isolating switches, and the earthing blades that are installed upstream and downstream of the contacts of the isolating switches; mechanical means are also present for locking the various drives, as required by the national and international regulations governing isolating switches, which are adapted to prevent movements that are ungoverned, and thus unwanted, of the movable contact elements between an isolating switch and a corresponding earthing blade.

Such conventional drives, although appreciated for their functionality, have a number of drawbacks, the foremost of which is linked to the presence of a drive unit, kinetic mechanisms and locking means for each contact element to be moved, with corresponding proportional costs of manufacture and assembly.

Furthermore each one of the drive units has to be electrically powered separately from the others, with consequent dedicated civil engineering works.

What is more, each drive unit with corresponding kinetic mechanisms and locking means has to be contained in a corresponding protection enclosure.

SUMMARY

An aim of embodiments of the present invention is to provide a device for actuating a rotating shaft selected from a plurality of parallel rotating shafts, which is capable of overcoming the above mentioned drawbacks of conventional drives.

Within this aim, an object of embodiments of the invention is to provide a device that comprises a lower number of components with respect to similar, conventional driving devices, and which at the same time is capable of fully executing the same activities.

Another object of embodiments of the invention is to provide a device that renders the assembly of an isolating switch simpler, and the related civil engineering works less expensive.

Another object of embodiments of the invention is to provide a device that can be governed both automatically and manually.

Another object of embodiments of the invention is to provide a device that is capable of reducing the general costs for the drive unit of an isolating switch and the costs of running such drive unit.

Embodiments of a device for actuating a rotating shaft selected from a plurality of parallel rotating shafts, wherein it comprises: a driving shaft supported and actuated by corresponding rotation means, which is provided with a driving gear for the transmission of torque, a plurality of driven shafts, each one of which is provided with a corresponding driven gear that is designed to be meshed with said driving gear, said driven gears being arranged on the respective driven shaft in an axial position that is offset with respect to the other driven gears, said driving gear being capable of performing a translational movement axially with means of translational motion for alternate meshing with one of said driven gears, said device further comprising means of prevention of rotation for the driven shafts whose driven gear is not meshed with said driving gear.

BRIEF DESCRIPTION OF THE DRAWINGS

Further characteristics and advantages of exemplary embodiments will become better apparent from the description of, nonexclusive, embodiments of the device according to the invention, which is illustrated by way of non-limiting example in the accompanying drawings wherein.

DETAILED DESCRIPTION

Figure 1:
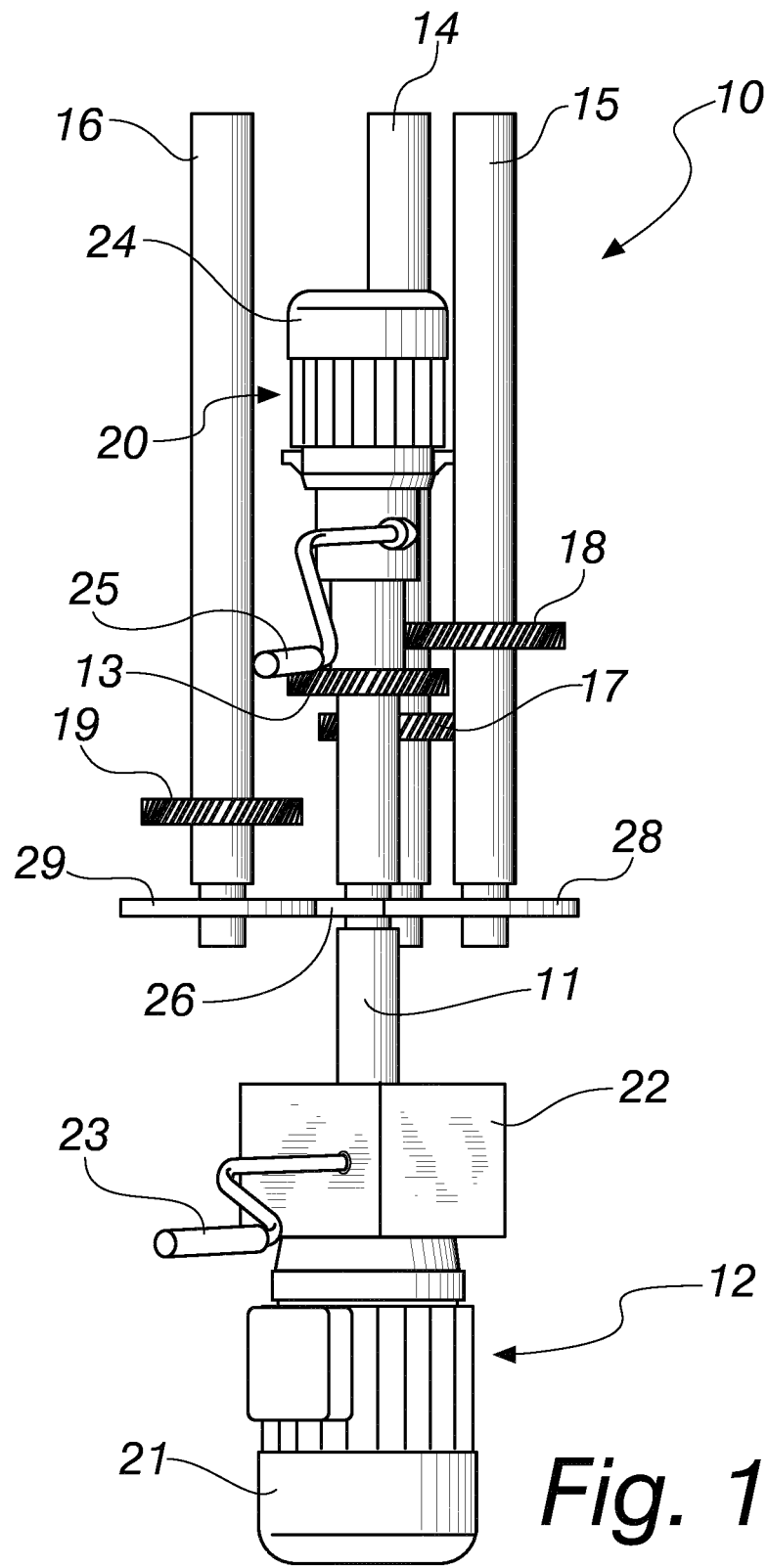
FIG. 1 is a view of the device according to an embodiment.

With reference to the figures, a device for actuating a rotating shaft selected from a plurality of parallel rotating shafts according to embodiments is generally designated with the reference numeral 10.

Such device 10 comprises: a driving shaft 11 supported and actuated by corresponding rotation means 12, which is provided with a driving gear 13 for the transmission of torque, three driven shafts, 14, 15 and 16 respectively, each one of which is provided with a corresponding driven gear 17, 18 and 19 that is designed to be meshed with the driving gear 13.

The driven gears 17, 18 and 19 are arranged on the respective driven shaft 14, 15 and 16 in an axial position that is offset with respect to the other driven gears.

The driving gear 13 is capable of performing a translational movement axially with means of translational motion 20 for alternate meshing with one of the driven gears 17, 18, 19.

The device 10 also comprises means 21, better described hereinbelow, of prevention of rotation for the driven shafts whose driven gear is not meshed with the driving gear 13.

The driving shaft, with its rotation means, and the three driven shafts are supported by a structure which should be understood as being of known type and is not shown for the sake of simplicity.

The rotation means 12 for the driving shaft comprise an electric motor with a reduction gearbox 22.

Such rotation means 12 also comprise a crank 23 for the manual actuation of the device 10 if necessary.

The means of translational motion 20 for the alternate meshing of the driving gear 13 with one of the driven gears 17, 18, 19 are constituted, by way of non-limiting example, by an electromechanical actuator of conventional type.

Such means of translational motion 20 can be actuated by way of an electric motor 24, or alternatively, in the event of no electric power supply, manually by way of a crank 25.

In the present embodiment of the device 10 according to an embodiment, described herein by way of non-limiting example, in the means 21 of prevention of rotation for the driven shafts that are not actuated, the driven shafts 14, 15 and 16 are arranged with the same distance between centers with respect to the axis of the driving shaft 11.

Such means of prevention of rotation 21 are constituted, for each rotating shaft 11, 14, 15, 16, by a disk-like body, 26, 27, 28, 29 respectively, the three disk-like bodies corresponding to the three driven shafts being fixed coaxially to the corresponding shaft, while the central disk-like body 26 is supported by the driving shaft 11 but is decoupled from it in terms of rotation.

Each disk-like body has a concave sector, 40, 41, 42, 43 respectively, with a profile shaped like a circular arc; the concavity of the concave sectors 41, 42, 43 of the driven disk-like bodies 27, 28, 29 has a slightly greater radius than the radius R of the central disk-like body 26, while the concavity of the concave sector 40 of the central disk-like body 26 has a contour and dimensions that are such as to allow, thereat, the rotation of each of the driven disk-like bodies 27, 28, 29.

In this manner the driven disk-like bodies 27, 28 and 29 can all be locked alternately by the central disk-like body 26 and each one of them is free to rotate when the concave sector 40 of the central disk-like body 26 is facing toward it.

In particular, in the present embodiment, the disk-like bodies 26, 27, 28, 29 have the same radius R which is greater than half of the distance between centers 30.

Each disk-like body has a concave sector, 40, 41, 42 and 43 respectively, with a profile shaped like a circular arc.

The concavity of such concave sector has a slightly greater radius than the radius R of the disk-like bodies.

The disk-like bodies are keyed, on the respective rotating shafts, mutually coplanar.

Such means of prevention of rotation 21 function as described below.

The central disk-like body 26, which is coaxial with the driving shaft 11, can assume an angular position selected from a number of positions which is equivalent to the number of driven shafts, three in the present embodiment.

Figure 2:
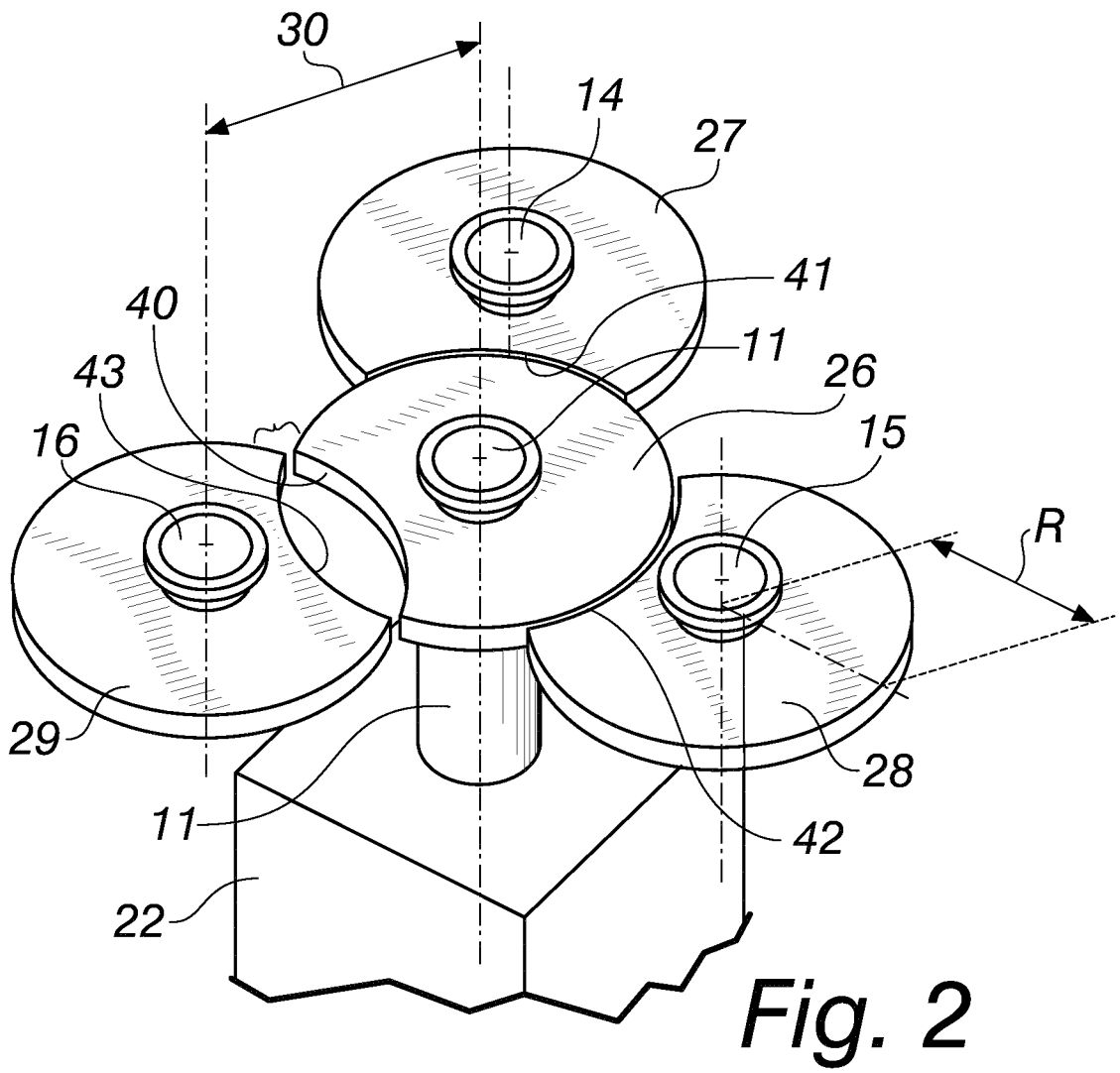
FIG. 2 is a perspective view of a detail of the device in FIG. 1.

The central disk-like body 26, as in FIG. 2, can be rotated and positioned so that its concave sector 40 is facing toward the third disk-like body 29, and in such situation the third disk-like body 29 is free to rotate together with the third driven shaft 16; at the same time the central disk-like body 26 occupies, with corresponding perimetric portions, the concave sectors 41 and 42 respectively of the first disk-like body 27 and of the second disk-like body 28, thus preventing the rotation of these latter two.

The central disk-like body 26 is able to rotate so as to be arranged with its concave sector 40 facing toward any one of the three disk-like bodies 27, 28 and 29 of the driven shafts 14, 15 and 16, thus alternately freeing the rotation of one driven shaft only with the simultaneous locking of the other two.

The rotation of the central disk-like body 26 is provided by way of the same electric motor 24 that commands the electromechanical actuator for the driving gear, by way of means of transmission of rotation which are adapted to synchronize the translational motion of the driving gear 13 toward the engagement with one of the driven gears 17, 18 and 19, with the simultaneous rotation of the central disk-like body 26 so as to free the rotation of the disk-like body 27, 28 or 29 corresponding to the driven gear with which the driving gear 13 is to mesh.

This can be made possible for example by way of two concentric shafts, which are locked in mutual rotation, i.e. designed to rotate together, but of which one is capable of performing a translational movement with respect to the other; the outer shaft can perform a translational motion with respect to the inner shaft supporting the driving gear 13, while the inner shaft, which is axially fixed, supports the central disk-like body 26 thus making it rotate.

The means of translational motion 20 with the electric motor 24, and the corresponding means 21 of prevention of rotation can be supported by the driving shaft 11.

In practice it has been found that embodiments achieve the intended aim and objects.

In fact, with an embodiment a device for actuating a rotating shaft selected from a plurality of parallel rotating shafts is provided which makes it possible to employ a single motor to alternately actuate one of a plurality thereof, thanks to the coordinated actuation of the means of translational motion 20 for the alternate meshing of the driving gear 13 with one of the driven gears 17, 18, 19, and of the means 21 of prevention of rotation for the driven shafts that are not actuated, which determine the simultaneous locking of two driven shafts and the transmission of power to the third driven shaft, which remains free to rotate.

Furthermore, with an embodiment a device is provided that makes it possible to move a rotating shaft selected from a plurality of rotating shafts, with the shafts that are not made to rotate being kept stably motionless in a precise preset configuration of non-use thanks to the aforesaid means of prevention of rotation, as required by the national and international regulations governing isolating switches.

What is more, with an embodiment a device is provided which is constituted by a lower number of components with respect to similar, conventional driving devices, and at the same time is capable of fully executing the same activities, thus at a lower cost from the viewpoint of its production and from the viewpoint of assembly, and also from the viewpoint of maintenance.

Furthermore, with an embodiment a device is provided which renders the related civil engineering works less expensive, since the electrical drive units are coaxial and very proximate to each other and can be reached with a single electrical line, and not with three separate electrical lines as with the drives for three shafts with a corresponding number of corresponding drive units, typical of conventional isolating switches.

Furthermore, with an embodiment a device is provided which can be protected by way of a single containment and protection enclosure, instead of with three separate containment enclosures as with the drives for three shafts with a corresponding number of corresponding drive units of the known type.

With an embodiment a device is thus devised which is capable of reducing the general costs for the drive unit of an isolating switch and the costs of running such drive unit.

In an embodiment, thus conceived, is susceptible of numerous modifications and variations, all of which are within the scope of the appended claims. Moreover, all the details may be substituted by other, technically equivalent elements.

In practice the components and the materials employed, provided they are compatible with the specific use, and the contingent dimensions and shapes, may be any according to requirements and to the state of the art.

Where technical features mentioned in any claim are followed by reference signs, such reference signs have been inserted for the sole purpose of increasing the intelligibility of the claims and accordingly such reference signs do not have any limiting effect on the interpretation of each element identified by way of example by such reference signs.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device for actuating a shaft selected from a plurality of parallel shafts, comprising:
   a driving shaft supported and actuated by an electric motor, the driving shaft provided with a driving gear for transmission of torque;
   each of the plurality of parallel shafts is provided with a respective driven gear that is designed to be meshed with the driving gear;
   each of the respective driven gears being arranged at a respective axial position, the respective axial positions are different from each other;
   an actuator configured to axially move the driving gear to mesh with the respective driven gear of the shaft selected from the plurality of parallel shafts;
   each of the driving shaft and the plurality of parallel shafts has a respective disk body mounted thereon, the respective disk body on the driving shaft preventing rotation of the other of the plurality of parallel shafts other than the shaft selected from the plurality of parallel shafts having the respective driven gear with which the driving gear is meshed.

2. The device according to claim 1, wherein the electric motor for the driving shaft comprises a reduction gearbox and a crank.

3. The device according to claim 1, wherein the actuator is constituted by an electromechanical actuator.

4. The device according to claim 1, wherein the actuator is actuated by way of an electric motor, or manually by way of a crank.

5. The device according to claim 1, wherein the driving shaft includes an axial axis and each of the plurality of parallel shafts has a respective axial axis that is separated from the axial axis of the driving shaft by a respective distance, the respective distances are substantially equal.

6. The device according to claim 1, wherein the respective disk bodies are mutually co-planar.

7. The device according to claim 1, wherein each of the respective disk bodies includes a respective concave section having a respective profile of a respective circular arc, wherein each of the respective circular arcs has a respective radius, wherein the respective radii of the respective circular arcs of the respective disk bodies of the plurality of parallel shafts is greater than a radius of the respective disk body of the driving shaft.

8. The device according to claim 7, wherein the respective concave sector of the respective disk body of the driving shaft is dimensioned to allow rotation of the respective disk body of the shaft selected from the plurality of parallel shafts.

9. The device according to claim 1, wherein the electric motor rotates the respective disk body of the driving shaft, wherein the axial movement of the driving gear and the rotation of the respective disk body of the driving shaft are synchronized so as to allow for rotation of the respective disk body of the shaft selected from the plurality of parallel shafts.

\* \* \* \* \*